Dec. 24, 1935.  F. M. CLARK  2,025,570
FILTERING APPARATUS
Filed May 19, 1934
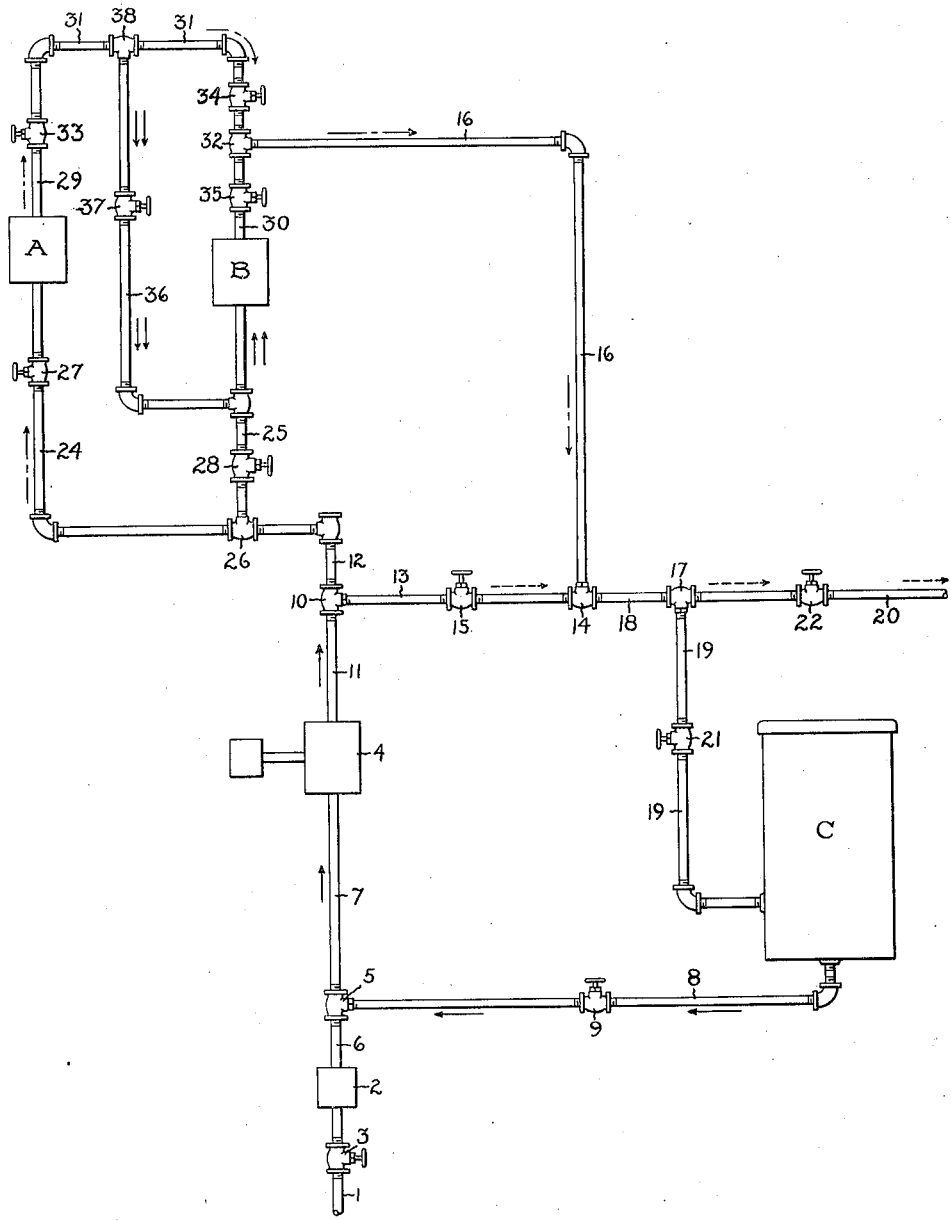
Inventor:
Frank M. Clark,
by Harry E. Dunham
His Attorney.

Patented Dec. 24, 1935

2,025,570

UNITED STATES PATENT OFFICE 2,025,570

FILTERING APPARATUS

Frank M. Clark, Pittsfield, Mass., assignor to General Electric Company, a corporation of New York Application May 19, 1934, Serial No. 726,497

7 Claims. (Cl. 210—177)

My invention relates generally to an improved reclaiming and filtering apparatus and more specifically to apparatus which may be used selectively for the reclamation of badly contaminated liquid, such for example, as mineral oil by a batch treating method, or for simple filtration of less contaminated oil to dehydrate or otherwise purify it.

In the use of my improved apparatus for the reclamation of badly contaminated oil it is preferable to use a batch method of procedure which usually consists in pumping a predetermined quantity or batch of the oil to a mixing tank where the oil is heated to decrease its viscosity and a purifying agent, such as fuller's earth, is thoroughly mixed with the oil. Following the heating and the addition of the purifying agent, the mixture is pumped under pressure through a filter system and the filtrate is either returned to the mixing tank for further treatment or is discharged depending upon the condition of the oil after filtration. My improved apparatus also permits of a direct pumping of the contents of the mixing tank to an apparatus outlet conduit following treatment without passage through the filter system.

When, in the above apparatus and process, the oil containing suspended purifying agent is passed through the filter system the purifying agent is deposited on the walls of the filter elements and serves to prevent the clogging of the pores of the elements in addition to enhancing the purification of the contaminated oil.

When the oil is not badly contaminated but contains only a small amount of water or foreign matter, the batch method of procedure is not always necessary and in such cases my improved apparatus allows simple filtration, the oil being conducted directly from the inlet of the apparatus to the filter unit and thence directly to the outlet.

The flexibility of my improved apparatus permits one to carry out either the batch method with its various steps or the direct method by a single apparatus of compact arrangement.

It is an object of my invention to provide a new and improved apparatus for reclaiming and filtering oil, or the like, which is flexible in operation and compact in arrangement.

A further object of my invention is to provide an improved apparatus which may be used selectively to reclaim oil by the batch method, or by a more simple filtering operation.

For a better understanding of my invention reference will be had to the single figure of the drawing, which shows diagrammatically the novel apparatus and liquid circuit arrangement employed.

In the drawing the apparatus inlet conduit 1 leads to the inlet of the coarse filter 2 and has provided therein a valve 3. The function of the coarse filter 2 is to remove the larger particles of foreign matter from the contaminated oil and thereby prevent damage to the pump 4 and also to lessen the probability of clogging up the fine pores of the filter elements included in the structure of the filter units A and B. The outlet of filter 2 is connected to one opening of three-way connection 5 by the conduit 6. The remaining two openings of the three-way connection 5 are connected to the inlet of pump 4 and mixing tank C by means of the respective conduits 7 and 8. A valve 9 is provided in the conduit 8 for controlling the flow of fluid therethrough. The outlet of the pump 4 is connected to one opening of a three-way connection 10 by means of a conduit 11. One of the remaining openings of the connection 10 is connected to a filter system inlet conduit 12 and the second remaining opening of connection 10 is connected by a conduit 13 to one opening of a second three-way connection 14. A valve 15 is provided in the conduit 13 for controlling the liquid flow therethrough. A filter system outlet conduit 16 is connected to another opening of the three-way connection 14 and the remaining opening is connected to a third three-way connection 17 by conduit 18. The connection 17 is connected to mixing tank C by the conduit 19 and to the apparatus outlet conduit 20. Valves 21 and 22 are respectively located in the conduits 19 and 20.

In the use of my apparatus for the reclamation of badly contaminated oil, the oil is pumped by means of the pump 4 from a source (not shown) through inlet conduit 1, conduits 6, 7, 11, 13, 18 and 19 to the mixing tank C. For this operation it is necessary that valves 3, 15 and 21 shall be opened and that all other valves included in the apparatus circuit shall be closed. When the mixing tank C is filled to the desired capacity the pumping operation is interrupted after which the batch of contaminated oil (or other liquid) in tank C may be subjected to treatment, as by stirring into the oil a finely divided absorbent material such as fuller's earth, silica gel, or activated carbon, and heating. Upon the completion of the treatment the oil with the suspended material therein (referred to as purifying agent) is pumped to the filter system through conduits 8, 7, 11 and the filter system inlet 12, as indicated by arrows. For this operation valve 9 is opened and valves 3 and 15 are closed. It will be understood that the valves of the filter system have been previously adjusted in a manner hereinafter described to include the desired filter unit or units in the liquid circuit in the most advantageous manner. If it is desired to discharge the filtered oil from the filter system to a receiving receptacle without further treatment valve 22 is set in its open position and valve 21 is closed. If a retreatment and refiltering of the filtered liquid is desired, valve 22 is closed and valve 21 is opened so that the oil is directed back to the mixing tank C for additional treatment.

If the oil is so slightly contaminated that heating, and treating with a purifying agent is unnecessary, the apparatus may be used for simple and continuous filtration by simply closing valves 9, 15 and 21 to exclude the mixing chamber from the liquid circuit, after which the oil will pass directly from the apparatus inlet conduit 1 through the filter system to the apparatus outlet conduit 20 in a path which is easily traced on the drawing. If it is desired to subject badly contaminated oil to a preliminary filtering step prior to treatment the oil may be first pumped through the filter system and then to the mixing chamber by closing valves 9, 15 and 22 and opening the valve 21. It will be understood that in the various operations previously described, the filter units may be used either singly, or in series, or parallel, in the manner described hereinafter.

If it is desired to treat the oil in the mixing tank and then discharge the treated oil without passing it through the filter system, valves 3, 15 and 21 are first opened and all other valves are closed to permit the oil to be pumped from the source to the mixing tank. When the desired amount of oil has been pumped to the mixing tank the pump is stopped and the treatment is carried out. After the treatment is completed valves 9, 15 and 22 are opened and all other valves are closed, thereby establishing a liquid circuit from the mixing tank to the apparatus outlet conduit 20 which includes the pump 4, the path of the oil including the arrows shown in dotted lines.

It has been found desirable in certain cases of badly contaminated oil containing finely divided carbon particles or the like to precoat the filter tubes contained in the filter units A and B with a coating of finely divided material before the oil to be filtered is pumped through the filter units. To accomplish this end a batch of clean oil is pumped to the mixing tank C and the desired quantity of finely divided material is mixed therewith after which the mixture is pumped through one or both of the filter units A and B. As the mixture of oil and filter aid encounters the walls of the filter tubes the finely divided material is separated from the oil and builds up in layers on the walls of the tubes.

The filter system connections are so arranged that the filter units may be selectively connected in the system singly, or together in series, or in parallel as desired. To this end the inlet conduits 24 and 25 which are respectively connected to filter units A and B, are connected to the filter system inlet conduit 12 by means of a three-way connection 26. Valves 27 and 28 are provided respectively in the inlet conduits 24 and 25 for controlling the flow of liquid to the filter units A and B. The outlet conduits 29 and 30, which are connected respectively with the outlet openings of the filter units A and B are connected together by means of a conduit 31 and three-way connection 32. Valves 33, 34 and 35 are provided in outlet conduit 29, conduit 31 and outlet conduit 30, respectively. A cross conduit 36 having a valve 37 therein connects a three-way connection 38 located in conduit 31 directly with the inlet of filter B and functions to connect the filter units A and B in series when the valve 37 is open. The three-way connection 32 which is connected between the conduit 31 and the outlet conduit 30 is also connected to the filter system outlet conduit 16.

In the operation of the filter system if it is desired to use filter unit A singly; valves 27, 33, 34 and 22 are opened and all other valves of the filter system are closed. The flow of the oil from the system inlet conduit 12 through filter unit A to the system outlet conduit 16 may be readily traced by dot and dash arrows on the drawing and need not be set out in detail. If it is desired to use filter unit B individually, valves 28 and 35 are opened and all other valves of the filter system are closed. If a series connection of the filter units is desired in order to obtain more perfect filtration of the oil, valves 27, 33, 37 and 35 are opened and the remaining valves are closed, the path of the oil then including the duct 36 as indicated by the double arrows. If it is desired to filter the oil rapidly, as for example when the apparatus is being used to continuously filter oil but slightly contaminated, then the valves 27, 28, 33, 34 and 35 are opened and valve 37 is closed, whereby the filter units are connected in parallel. From the foregoing description it will be seen that a filter system is provided which includes means for varying at will the capacity of the filter system. By arranging the filter units A and B so that they may be used singly, or in series or parallel, the system is rendered flexible in operation and may rapidly be changed to meet the requirements of a particular use of the apparatus.

While I have described what I consider to be the preferred embodiment of my invention, it will be understood that various modifications thereof may be made and I aim to cover in the appended claims all such modifications as fall within the spirit and scope of my invention.

What I claim as new and desire to secure by Letters Patent in the United States is:

1. In a reclaiming and filtering apparatus, an apparatus inlet conduit, a mixing tank, means including a pump for transferring liquid from said inlet conduit to said tank, filtering means, and means including said pump for selectively transferring liquid from said tank to said filtering means or from said inlet conduit to said filtering means.

2. An apparatus for purifying liquids comprising a mixing tank, a filter, an inlet conduit for liquid to be purified, a pump, and conveying conduits respectively connecting said pump to said inlet conduit, to said mixing tank, and to said filter, and valves in said conveying conduits for selecting the course of said liquid in said conduits to proceed alternatively from said inlet conduit through said pump to said tank, from said tank through said pump to said filter or from said inlet conduit through said pump to said filter excluding said tank.

3. In oil reclaiming and filtering apparatus, an apparatus inlet conduit, a mixing tank, filtering means, a pump having an inlet and outlet, a conduit connecting said pump inlet and said tank, said apparatus inlet conduit being connected to said conduit, valves in said conduits for selectively admitting oil to said pump from said tank or said inlet, a three-way connection, a plurality of conduits connecting said connection with said mixing tank, said pump outlet and said filtering means and valves in said last mentioned conduits for selectively directing oil from said pump to said filtering means or to said tank.

4. In a reclaiming and filtering apparatus, an apparatus inlet conduit, an apparatus outlet conduit, a mixing tank having an inlet, means including a pump for transferring liquid from said apparatus inlet conduit to said tank inlet, filtering means having inlet and outlet conduits, means including said pump for selectively transferring liquid from said tank to said filtering means inlet conduit or from said apparatus inlet conduit to said filtering means inlet conduit, and means for selectively transferring liquid from said filtering means outlet conduit to said tank inlet or to said apparatus outlet conduit.

5. In oil reclaiming and filtering apparatus, an apparatus inlet conduit and an apparatus outlet conduit, a mixing tank having an inlet, and an outlet, filtering means having an inlet and outlet, a pump, a conduit connecting the intake of said pump with said tank outlet, said apparatus inlet conduit being connected to said conduit, valves in said conduits for selectively admitting oil to said pump from said tank or said apparatus inlet, a three-way connection, a plurality of conduits connecting said connection with said mixing tank inlet, the exhaust of said pump and said filtering means inlet, valves in said last mentioned conduits for selectively directing oil from said pump to said filtering means or to said tank, a conduit connecting said filtering means outlet to said tank inlet and to said apparatus outlet conduit, and valves in said tank inlet and said apparatus outlet conduit for selectively directing the filtered oil to said tank or to said apparatus outlet conduit.

6. In a reclaiming and filtering apparatus, an apparatus inlet conduit, a mixing tank, means including a pump for transferring liquid from said inlet conduit to said tank, filtering means, means for varying the capacity of said filtering means, and means including said pump for selectively transferring liquid from said tank to said filtering means or from said inlet conduit to said filtering means.

7. In oil reclaiming and filtering apparatus, an apparatus inlet conduit, a mixing tank, means including a pump for transferring oil from said inlet conduit to said tank, a plurality of filter units, means for selectively connecting said units in series or in parallel thereby to vary the rate and degree of filtering, and means including said pump for selectively transferring oil from said tank to said filtering units or from said inlet to said filtering units.

FRANK M. CLARK.